United States Patent
Broch et al.

(10) Patent No.: US 10,452,624 B2
(45) Date of Patent: Oct. 22, 2019

(54) STORAGE AND ANALYSIS OF DATA RECORDS ASSOCIATED WITH MANAGED DEVICES IN A DEVICE MANAGEMENT PLATFORM

(71) Applicant: VMware, Inc., Palo Alto, CA (US)

(72) Inventors: Joshua Glenn Broch, Cupertino, CA (US); Abhishek Mishra, Atlanta, GA (US); Manu Nazareth, Marietta, GA (US); Gregory John Ferguson, Hunt Valley, MD (US); Phillip Charles Krasko, Redwood City, CA (US); Zundna Vennaldo Daniel, Roswell, GA (US)

(73) Assignee: VMware, Inc., Palo Alto, CA (US)

( * ) Notice: Subject to any disclaimer, the term of this patent is extended or adjusted under 35 U.S.C. 154(b) by 220 days.

(21) Appl. No.: 15/667,203

(22) Filed: Aug. 2, 2017

(65) Prior Publication Data
US 2019/0042604 A1   Feb. 7, 2019

(51) Int. Cl.
| | |
|---|---|
| G06F 16/00 | (2019.01) |
| G06F 16/21 | (2019.01) |
| G06F 3/06 | (2006.01) |
| G06F 16/22 | (2019.01) |

(52) U.S. Cl.
CPC .......... G06F 16/211 (2019.01); G06F 3/0604 (2013.01); G06F 16/2272 (2019.01)

(58) Field of Classification Search
CPC ... G06F 16/211; G06F 16/2272; G06F 3/0604

USPC ......................................................... 707/706
See application file for complete search history.

(56) References Cited

U.S. PATENT DOCUMENTS

| | | | |
|---|---|---|---|
| 7,761,863 B2 * | 7/2010 | Illowsky | G06F 1/3203 717/167 |
| 2008/0070495 A1 * | 3/2008 | Stricklen | H04W 8/22 455/3.01 |
| 2013/0227077 A1 * | 8/2013 | Tsai | G06F 16/284 709/219 |
| 2013/0254310 A1 * | 9/2013 | Krywaniuk | H04L 41/00 709/206 |
| 2014/0040579 A1 * | 2/2014 | Kripalani | G06F 3/065 711/162 |
| 2014/0040580 A1 * | 2/2014 | Kripalani | G06F 3/065 711/162 |
| 2014/0129530 A1 * | 5/2014 | Raufman | G06F 7/78 707/693 |
| 2015/0074259 A1 * | 3/2015 | Ansari | H04L 67/02 709/224 |
| 2015/0142860 A1 * | 5/2015 | George | G06F 16/22 707/812 |
| 2016/0112407 A1 * | 4/2016 | Nara | H04L 67/1095 726/5 |
| 2016/0350029 A1 * | 12/2016 | Nara | H04L 67/1095 |

(Continued)

*Primary Examiner* — Hanh B Thai
(74) *Attorney, Agent, or Firm* — Thomas | Horstemeyer, LLP

(57) ABSTRACT

A platform for storing and reporting of data records associated with management of a population of managed devices is disclosed. Data records are injected into a hosted computing environment in which data processing services are arranged to store and generate analytics associated with a mobile device management (MDM) platform.

20 Claims, 4 Drawing Sheets

(56) References Cited

U.S. PATENT DOCUMENTS

2017/0235494 A1* 8/2017 Kolbush ............... G06F 3/0607
                                                710/313
2017/0272521 A1* 9/2017 Takahashi ............... H04L 67/14
2017/0277560 A1* 9/2017 Lucas .................... G06F 9/4498
2018/0027006 A1* 1/2018 Zimmermann ..... H04L 63/0245
                                                726/11

* cited by examiner

STORAGE AND ANALYSIS OF DATA RECORDS ASSOCIATED WITH MANAGED DEVICES IN A DEVICE MANAGEMENT PLATFORM

BACKGROUND

Structured Query Language (SQL) databases can be designed for relatively large numbers of short transactions (e.g., insert, update, delete, etc.) and queries. SQL databases can be equipped to handle fast query processing, data integrity in multi-access environments, and high numbers of transactions per second. SQL databases often require a rigid structure and potentially complex schema that requires the data to be structured. In this context, "schema" refers to the manner or construct in which data is organized or, in the context of relational databases, divided into tables for databases.

SQL defines the standard syntax language for access to a SQL database, which is also known as a relational database management system (RDBMS). In a RDBMS, data is stored in database objects, such as tables including records. Tables can be representatively considered as collections of related data entries and consisting of numerous rows and columns. A non-relational database management system, or a NoSQL database management system, is also an increasingly popular database management system that is used for data storage and retrieval in cloud-based implementations of data processing systems.

In a mobile device management (MDM) system, large amounts of data can be generated that pertain to the operation of the various user devices that are enrolled as managed devices. For example, information about the whereabouts of a device, its compliance with one or more compliance rules or policies, and information about the operation of applications installed on the device can be logged and reported to a management service that can store or warehouse the data. As the prevalence of device management systems in enterprise settings grows, the scalability of the system that processes and stores data related to the devices that are managed in the MDM platform can be a constraint on the effectiveness of the platform.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
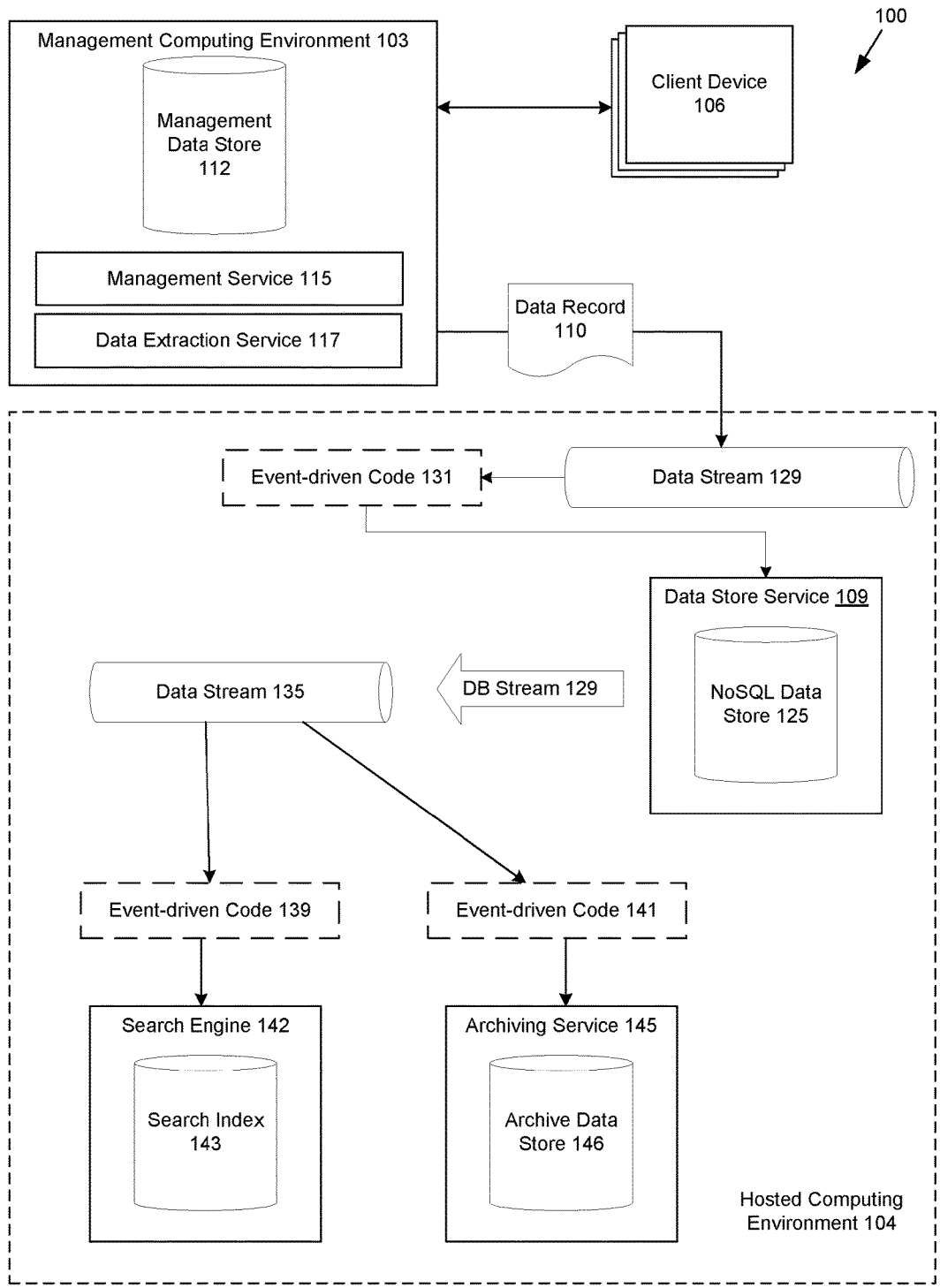
FIG. 1 illustrates an example networked environment according to various examples described herein.

Enterprise-level mobile device management (MDM) platforms can be relied upon to facilitate the management of large numbers of devices, including desktop, laptop, and mobile devices. For example, the enrollment and association of users to mobile devices can be facilitated by MDM platforms. Similarly, the distribution, installation, and access to applications on a number of mobile devices can be managed by MDM platforms. Device management policies, compliance rules, and configurations can be enforced by MDM platforms through access, application, and feature/function controls on the devices.

Just as in other fields and industries, enterprise-level MDM platforms can capture large amounts data associated with the activity of the various devices that are enrolled as managed devices. In some platforms, nearly every action taken by a device or by a management service that remotely manages a device can be logged in a data store. For example, the applications that a user installs or uninstalls, the location data of a device, the usage data associated with various applications, application crash data, or information about documents or other files stored on the device can all be logged in a data store accessible to a management service.

In the case of a hosted management service that might manage devices for various enterprises can result in the creation of a large number of data records. As the usage of MDM platforms grows, there exists a need to efficiently store and access these data records for compliance, reporting, and data analytics purposes. Accordingly, examples of this disclosure provide a cloud-based infrastructure for housing data associated with the devices that are managed by a MDM platform in a way that is scalable and reliable.

Many MDM platforms store data associated with managed devices in a SQL database that has a rigid table structure and is often not designed with scalability in mind. Cloud-based NoSQL storage platforms and more complex search engines can allow for more complicated analytical and ad hoc queries. A schema-less NoSQL database can provide more flexibility and allow for modern analytics techniques to be applied to event data that is logged with respect to a population of managed devices.

In the context outlined above, aspects of event based database synchronization are described herein. For example, data stored in a SQL-based database, which is defined according to a particular schema, can be ported and synchronized to a relatively schema-less NoSQL analytics database and special-purpose search engine for the purpose of conducting business intelligence and analytics processing. The analytics database and search engine can be implemented atop a cloud-based computing platform, which can be provided in hosted environment that provides scalability. For example, the platform can include the services provided by Amazon Web Services (AWS). According to examples of this disclosure, when a data record is generated by the MDM platform and stored in its transactional database, the data record can also be provided to a service that is executed within the cloud-based platform, which can store the event record in a NoSQL-based database and a search engine. The data record can also be accessed, along with other data records associated with a population of managed devices, by a reporting and analytics service that can generate reports about a population of managed devices for analysis by an administrator.

Reference is now made to FIG. 1, which illustrates a networked environment followed by a discussion of the operation of the same. FIG. 1 illustrates an example networked environment 100 for storing data records associated with a population of managed devices according to various examples described herein. The networked environment 100 includes a management computing environment 103, a number of client devices 106, and a hosted computing environment 104 in which various other components of the system are implemented, as will be described below. Aspects of storage and analysis of data records generated by the management computing environment 103 are described below with reference to the components that are implemented within the hosted computing environment 104, but those components are representative and other networked environments and components can perform the concepts described herein.

The management computing environment 103 can be embodied as one or more computers, computing devices, or computing systems. In certain embodiments, the management computing environment 103 can include one or more computing devices arranged, for example, in one or more server or computer banks. The computing device or devices can be located at a single installation site or distributed among different geographical locations. The management computing environment 103 can include a plurality of computing devices that together embody a hosted computing resource, a grid computing resource, or other distributed computing arrangement. In some cases, the management computing environment 103 can be embodied as an elastic computing resource where an allotted capacity of processing, network, storage, or other computing-related resources varies over time. As further described below, the management computing environment 103 can also be embodied, in part, as certain functional or logical (e.g., computer-readable instruction) elements or modules as described herein.

The management computing environment 103 can function as a device management service for any number of devices, including the client devices 106. In that context, the management computing environment 103 includes a management data store 112. The management computing environment 103 can also execute a management service 115 and a data extraction service 117. The management data store 112 includes areas in memory for storage of data pertaining to devices that are managed by the management service 115. The data can include device records that correspond to devices that are enrolled with the management service 115 as well as event logs or event data that pertain to the activity of a managed device. The data in the management data store 112 can include user data, such as email, documents, calendar data, and contacts. The management data store 112 can also house authentication information that allows the management service 115 to authenticate a user or a device. The management data store 112 can also store data associated with policies or configuration profiles that are associated with a user account and client devices 106 that are managed by the management service 115.

The management service 115 can be implemented as a hosted MDM solution that allows a provider to manage devices on behalf of multiple enterprises or organizations. Accordingly, the management data store 112 can store data associated with client devices 106 that are managed on behalf of various enterprises.

The management service 115 can provide a user interface or administrative console that allows an administrator to view, edit, or otherwise administer the management of client devices 106 on behalf of the management service 115. The administrative console can allow the administrator to add or define new management policies or configuration profiles, add or edit policies or profiles that are applied to particular client devices 106, or perform other management tasks that pertain to the management of client devices 106 by the management service 115.

The data extraction service 117 can extract data records that are created by the management service 115 within the management data store 112 and provide them to a configuration of components that are established within the hosted computing environment 104. The data record can be stored, archived, and indexed for reporting and analytics purposes.

The hosted computing environment 104 can represent a cloud computing platform that can provide on-demand computing resources and services. For example, the platform can provide on-demand virtual machines that can be purchased or leased on behalf of a particular account. The platform can also provide higher level services that can instantly or nearly instantly scale up or down depending upon the usage or transaction volume. For example, the hosted computing environment 104 can provide a data store service 109 that provides a NoSQL database service that runs atop physical machines within the hosted computing environment 104. Upstream or downstream users of the data store service 109 need not concern themselves with scaling, sharding, or other internal management aspects of the database or databases in which data is stored in a NoSQL data store 125 within the data store service 109. The data store service 109 can represent a NoSQL database service such as Amazon DynamoDB®.

The hosted computing environment 104 can also provide a data stream service, which can provide a service streaming data in real time with the ability to processing many data streams over small time periods. A data stream service can allow an upstream service to submit potentially large volumes of data without having to account for the scalability of the service. The data stream service can allow one or more data streams to be established within the hosted computing environment 104 so that records placed on the stream can be processed as and when they can without risking a bottleneck within the data extraction service 117. The hosted computing environment 104 can also provide other services, such as a search engine service, a cold-storage database, or a relational database service.

Accordingly, examples of this disclosure are directed to an architecture that is established within the hosted computing environment 104 that provides a scalable mechanism to house data records generated by the management service 115 that can be warehoused within the hosted computing environment 104 by the data extraction service 117.

The management computing environment 103 can communicate with client devices 106 that are managed by the management service 115 and with the hosted computing environment 104 over a network. The network can include the Internet, intranets, extranets, wide area networks (WANs), local area networks (LANs), wired networks, wireless networks, cable networks, satellite networks, other suitable networks, or any combinations thereof. As one example, the management computing environment 103, the client devices 106, and the hosted computing environment 104 can be respectively coupled to one or more public or private LANs or WANs and, in turn, to the Internet for communication of data among each other.

In the networked environment 100, the management computing environment 103, the client devices 106, and the hosted computing environment 104 can communicate data among one other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client devices 106 are representative of one or more client devices. The client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client device 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 106.

A client device 106 that is managed by the management service 115 can also execute a management component, which can be a standalone application or a portion of the operating system of the client device 106. Upon enrollment of a client device 106 with the management service 115, the management component can enforce compliance policies or rules on the client device 106, report device activity to the management service 115, or take other actions on the client device 106 that are specified or directed by the management service 115.

Turning back to aspects of the management computing environment 103, the management service 115 can be configured to operate as a mobile device manager for one or more of the client devices 106. During a device management enrollment process, the management service 115 can remotely configure one or more of the client devices 106 for device management. To that end, as noted above, the management service 115 can coordinate with the operating systems of the client devices 106 (and/or management components or applications executing on the client devices 106) to register and configure the client devices 106 for device management.

As part of the device management enrollment process (and even after enrollment has concluded), the management service 115 can install and uninstall certain software components on the client devices 106. The software components can include applications, resources, libraries, drivers, device configurations, and other related components. The management service 115 can also transfer device management data, including management policies, compliance rules, configuration data, and other policies and rules to the client devices 106. During and after this enrollment process, the management service 115 can gather various types of data related to the status, use, and management of the client devices 106. The data can be associated with hardware, software, user, network, and other aspects of the status, use, and management of the client devices 106. The data can be stored by the management service 115 in the management data store 112 for reference and processing in connection with device management. According to examples of this disclosure, the data extraction service 117 can also replicate this data to the architecture created within the hosted computing environment 104.

The management data store 112 can be embodied as a transactional database to store a number of tables having a number of records defined according to a schema for the purpose of MDM. Thus, as a reference database for device management, the management data store 112 can be created, administered, updated, and referenced over time by the management service 115. Access to the management data store 112 can be driven by changes or actions which occur on the client devices 106 with relatively high frequency and volume over time. In that context, the management data store 112 can be implemented as a relational or SQL-based database.

The management data store 112 can be organized into tables having records of rows, columns, attributes, etc. according to a schema, for example, and any number of data values can be stored in the tables. As noted above, the management data store 112 can be used by the management service 115 to store data related to the status, use, and management of the client devices 106. Among other types of data, the records in the management data store 112 can include hardware- and software-related device identifiers, version numbers, serial numbers, and related data of the client devices 106. The data can also include lists of applications, rules, policies, and files installed on the client devices 106, lists of users associated with the client devices 106, application- and device-level resource usage data associated with the client devices 106, and access data associated with the client devices 106, among other data. Thus, over time, the management data store 112 can be populated with a significant amount of useful data representative of various operating characteristics and settings of the client devices 106. In operation, the data values stored in the management data store 112 might frequently change over time.

However, the access demands placed on the management data store 112 by the management service 115 (and the constraints imposed due to the relational database schema structure of the management data store 112) limit the ability to process the data in the management data store 112 for the purpose of business intelligence and analytics. Therefore, the data extraction service 117 can replicate the records in the management data store 112 to the hosted computing environment 104.

Referring back to FIG. 1, the storage or replication of a data record 110 within the hosted computing environment 104 is now discussed. First, a data record 110 is created by the management service 115 and stored within the management data store 112. The data record 110 can pertain to the activity of a device that is enrolled with the management service 115 as a managed device. The data record 110 is placed on a data stream 129. The data stream 129 is representative of an event bus or a real-time streaming platform. For example, Amazon Kinesis® Firehose can be employed to load the event record 110 into the hosted computing environment 104. The data stream 129 can be created and instrumented so that other applications or services within the hosted computing environment 104 are alerted to and can act on the data record 110 once it is loaded onto the data stream 129.

The data stream 129 or another authentication service can be configured to authenticate the data extraction service 117 and its access to the hosted computing environment 104. The data extraction service 117 can be verified based upon an authentication token or API token that is presented to the data stream 129 within the hosted computing environment 104.

In an implementation of this disclosure, event-driven code 131 can be executed on the data record 110 once it is loaded onto the data stream 129. The event-driven code 131 can be created within the hosted computing environment 104 in a service that allows for the execution of code without provisioning or managing servers within the hosted computing environment 104, such as in a service like AWS Lambda®.

The event-driven code 131 can generate a unique identifier for the data record 110 and store the data record 110 along with its unique identifier into the data store service 109.

The unique identifier generated by the event-driven code 131 can be the key that allows the data record 110 to be located within the data store service 109. In some examples, the event-driven code 131 can generate a partition key that identifies a partition within the data store service 109 in which the data record 110 can be stored. In either scenario, the partition key or unique identifier can be based upon an identifier that identifies the enterprise or organization within the management data store 112, such as an organization group identifier.

The event-driven code 131, in some examples, can store the data record 110 into a current snapshot of the data associated with a particular population of managed devices within the data store service 109. The data record 110 can also be stored into a historical partition within the data store service 109. The historical partition can house all data records 110 associated with a particular population of devices that are managed by the management service 115. The historical partition for a particular enterprise can also be identified based at least in part by the organizational group or some other enterprise identifier that uniquely identifies the enterprise from other enterprises that are serviced by the management computing environment 103. The organizational group is an identifier within a directory service, such as Microsoft® Active Directory, that identifies which user group a particular user account belongs to within a user directory.

The data store service 109 can be configured to export changes or additions to the NoSQL data store 125 to a database stream 129. The database stream 129 can represent an ordered flow of modifications made to the table within the NoSQL data store 125 that corresponds to the current snapshot of data records 110 that are stored in the data store service 109. Accordingly, the data store service 109 can be instrumented to output the addition of new records to the database stream 129, which can be fed into another data stream 135.

From the data stream 135, event-driven code 139 and 141 can be triggered. Event-driven code 139 is instrumented to store the data record 110 into the search engine 142. The search engine 142 can index the event record 110 into a search index 143 and can later be used to generate reports or data analytics on data stored about a population of managed devices. The search engine 142 can represent a search service such as Amazon® Elasticsearch Service. The search engine 142 can represent a managed search service that provides API's that allow for search results or other analytics to be generated from data that is indexed into the search index 143. Search results or analytics can be generated with respect to a particular window of time associated with data records 110 that are stored within the search index 143 by the search engine 142.

Event-driven code 141 can archive the data record 110 into the archiving service 145. The archiving service 145 can represent a service such as Amazon S3®, which allows for data to be archived. The archiving service 145 need not provide database capabilities or searching capabilities. Instead, the archiving service 145 can provide a cheap storage solution relative to the search engine 142 or data store service 109 where all event records 110, or at least event records 110 pertaining to a moving historical window or window of time, can be archived. To this end, the archiving service 145 can include an archive data store 146. The archive data store 146 can provide a file system or other mass storage resources into which data records 110 obtained from the event-driven code 141 can be stored.

Figure 2:
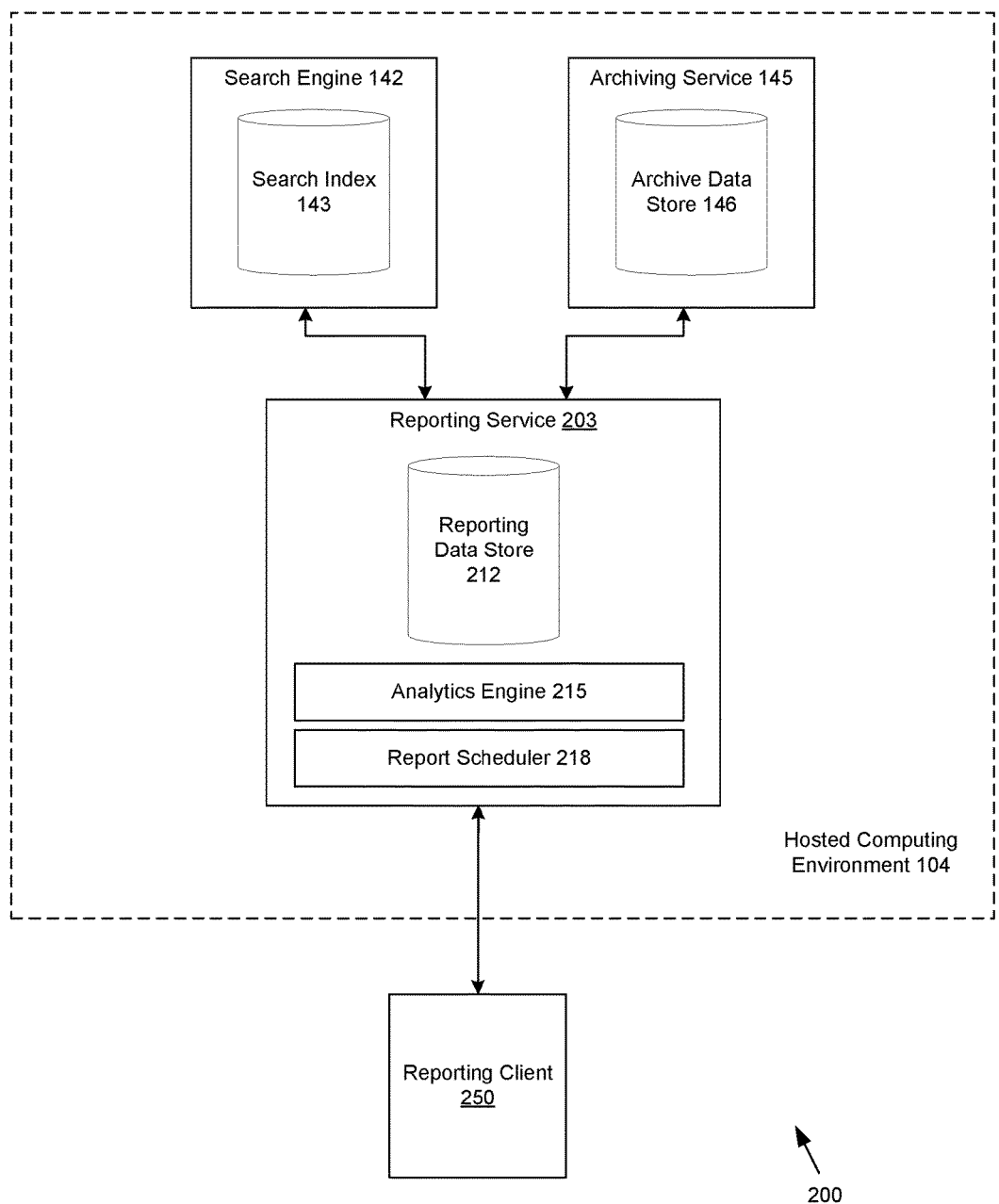
FIG. 2 illustrates an example networked environment according to various examples described herein.

Reference is now made to FIG. 2, which illustrates a networked environment 200. FIG. 2 illustrates certain components that were introduced and shown in FIG. 1, such as the search engine 142 and archiving service 145. In FIG. 2, a reporting service 203 is also shown in the hosted computing environment 104. The reporting service 203 can represent a network accessible service that can provide a portal for accessing reports or analytics that are generated from the data housed within the search engine 142 and archiving service 145.

The reporting service 203 can be implemented on one or more virtual machines that are created within the hosted computing environment 104. For example, the reporting service 203 can be established on a virtual machine within Amazon EC2® or as a web service running on AWS® Elastic Beanstalk. The reporting data store 212 can store reports that are generated by the reporting service 203 as well as metadata associated with the reporting service 203.

The reporting service 203 can execute an analytics engine 215 that can perform analysis of data in the search engine 142 to generate reports associated with a population of devices managed by the management service 115. Analytics can include reports or queries that can provide insight into the operation of the management service 115 or a population of devices that are managed by the management service 115. Analytics can be generated based upon queries that can be performed against the search index 143 maintained by the search engine 142. The queries can be formatted such that they are supported by the query language implemented by the search engine 142.

The report scheduler 218 can generate scheduled reports that include analytics based upon a schedule specified by a user. For example, if an administrator desires a monthly report pertaining to the usage of a population of devices, the report scheduler 218 can generate the report based upon a schedule that is defined and stored within the reporting data store 212. The resulting report can similarly be stored in the reporting data store 212 or transmitted to the administrator.

The reporting client 250 can represent a computing device through which a user can interface with the reporting service 203. A user can view a user interface, such as a webpage, generated by the reporting service 203 to view reports stored in the reporting data store 212, schedule reports through the report scheduler 218, or create new analytics queries that can be executed by the reporting service 203 against the search index 143.

Figure 3:
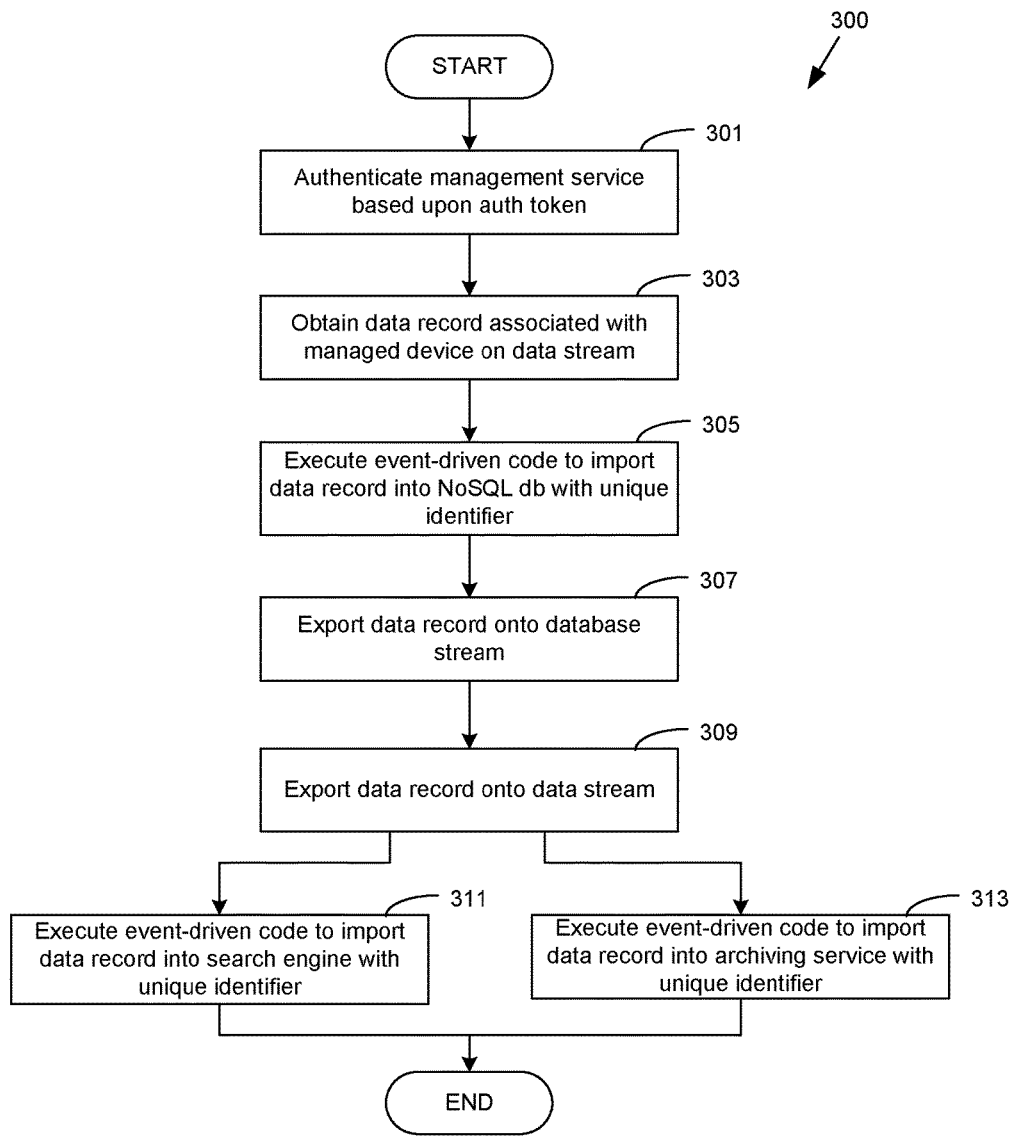
FIG. 3 illustrates an example method according to various examples described herein.

Reference is now made to FIG. 3, which illustrates an example method 300. The method 300 of FIG. 3 shows an example of how the architecture created within the hosted computing environment 104 can receive a store a data record 110 that is provided by the management computing environment 103. Although FIG. 3 shows an order of execution, the order of execution can differ from that which is shown. For example, the order of execution of two or more elements or steps can be switched relative to the order shown or as described below. Two or more elements shown in succession can be executed concurrently or with partial concurrence, and one or more of the elements shown in the flowcharts can be skipped or omitted.

First, at step 301, the data stream 129 or another entry point into the architecture created within the hosted computing environment 104 can authenticate the data extraction service 117 or management service 115. Authentication can be completed by authenticating an authentication token or an API token that is presented by the data extraction service 117 to the hosted computing environment 104. The authentication process can verify that the management computing environment 103 is the originator of a data record 110 provided to the data stream 129.

At step 303, the data stream 129 can obtain the data record 110 from the data extraction service 117. As noted above, the data record 110 can correspond to information about one or more of a population of client devices 106 managed by the management service 115. In one example, the data record 110 can be an event log or a record that is representative of one or more operating characteristics or settings of a client device 106 that is managed by the management service 115. The data record 110 can also be representative of a record within the management data store 112, which can be a SQL based database that is used by the management service 115 to store data pertaining to the operation of client devices 106 that are enrolled as managed devices.

The data stream 129 can represent a data bus or a real-time streaming platform that facilitates ingestion of data into the hosted computing environment 104. The data record 110 can be exported from the management computing environment 103 by the data extraction service 117. The data stream 129 can also alert other services that can be subscribed to the data stream 129 to be updated whenever a new data record 110 is placed onto the data stream 129.

At step 305, the event-driven code 131 that can be defined within the hosted computing environment 104 that linked to the data stream 129 can be executed. The event-driven code 131 can be defined within a serverless computing service that allows for code to be defined without provisioning a dedicated server on which to execute the code. For example, the event-driven code 131 can be defined within a service such as AWS® Lambda. The event-driven code 131 can be defined to obtain the data record 110 from the data stream 129 and generate a unique identifier for the data record 110, which can be based upon the organizational group identifier of the device to which the data record 110 corresponds.

The event-driven code 131 can also perform any necessary data formatting that ready the data record 110 for storage within the data store service 109. The event-driven code 131 can also store the data record 110 along with its identifier within the data store service 109 or another NoSQL database service. In some examples, the event-driven code 131 can store the data record 110 in an appropriate partition based upon an enterprise account within the management computing environment 103 so that the data of different customers of the management service 115 are segmented from one another into different partitions within the data store service 109.

At step 307, the data record 110 can be exported from the data store service 109 onto a database stream 129 established within the hosted computing environment 104. The database stream 129 can be linked to the particular deployment of the data store service 109 created within the hosted computing service 104. Any updates to the tables associated with the data records 110 received from the management computing environment 103 can be published on the database stream 129.

At step 309, the data record 110 published on the database stream 129 can be exported onto the data stream 135. The data stream 135 can serve as a vehicle to facilitate storage of the data record 110 within the search engine 142 and archiving service 145. The data stream 135 can also trigger additional instances of event-driven code that facilitate storage of the data record 110 within the search engine 142 and archiving service 145.

Next, the process can proceed to steps 311 and 313, which can be performed in parallel. At step 311, the event-driven code 139 can be executed. The event-driven code 139 can facilitate storage of the data record 110 into the search engine 142. The search engine 142 can index the data record 110 within the search index 143 to facilitate reporting and analytics.

At step 313, the event-driven code 141 can be executed. The event-driven code 141 can cause the data record 110 to be stored within the archiving service 145. The archiving service 145 can provide cold storage of the data record 110 in an archiving service 145 that can be provided at a lower cost than the data store service 109, for example. In some examples, the data store service 109 might only house current operational or snapshot data associated with a population of devices instead of full historical record of device data. Thereafter, the process can proceed to completion.

Figure 4:
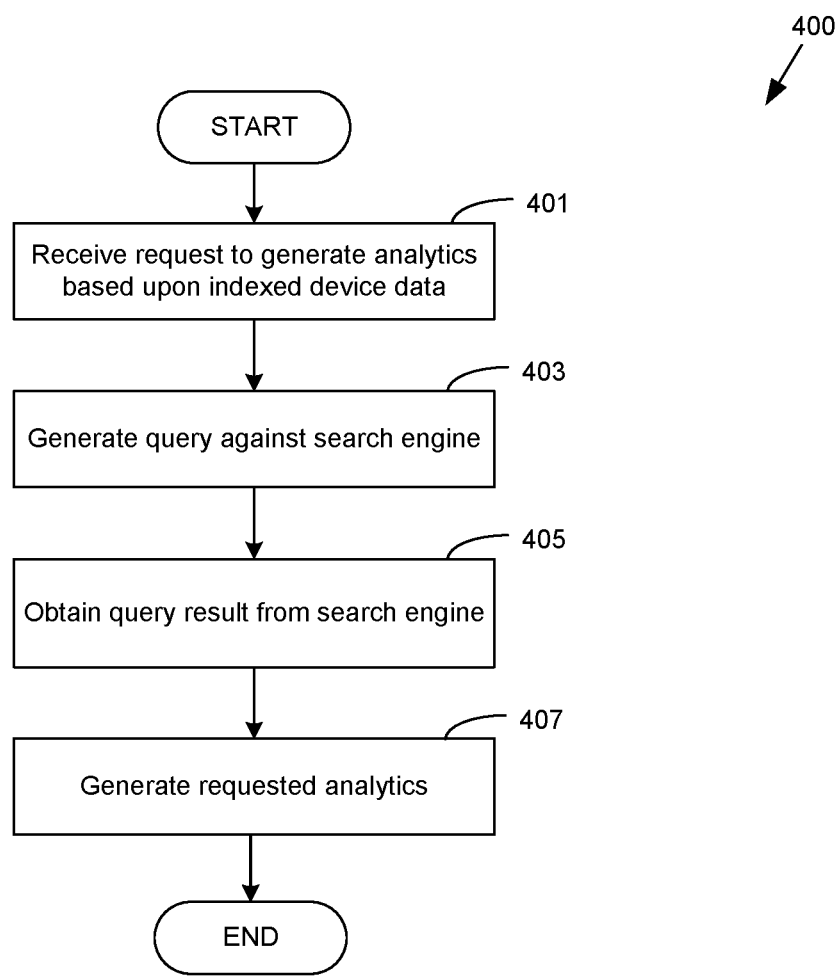
FIG. 4 illustrates an example method according to various examples described herein.

Reference is now made to FIG. 4, which illustrates an example method 400. The method 400 of FIG. 4 shows an example of how the architecture created within the hosted computing environment 104 can generate a report containing analytics that are based upon the data stored within the search engine 142. Although FIG. 4 shows an order of execution, the order of execution can differ from that which is shown. For example, the order of execution of two or more elements or steps can be switched relative to the order shown or as described below. Two or more elements shown in succession can be executed concurrently or with partial concurrence, and one or more of the elements shown in the flowcharts can be skipped or omitted.

First, at step 401, the reporting service 203 can receive a request to generate analytics based upon data associated with a population of client devices 106. The data can be stored in the data store service 109 and indexed within the search engine 142. The request can be received from a reporting client 106 through a user interface presented to a user or via an API request that is received by the reporting service 203.

At step 403, the reporting service 203 can generate a query that can be executed within the search engine 142. The query can reflect the requested report or analytics from step 401. For example, the requested report or analytics can reflect a particular period of time, a particular population of client devices 106, or a particular type of data that is housed within the search engine 142.

The query can also be directed towards data housed within the search engine 142 that is associated with a particular enterprise account within the management platform provided by the management computing environment 103. For example, if the analytics are being requested on behalf of a first customer, the query can be constructed such that only data records 110 housed in the search engine 142 that are associated with the first customer and not other customers is returned in a search or query result. Generating the query can involve determining what data is needed from the search engine 142 to construct the requested report or analytics and forming an appropriate query against the search engine 142.

At step 405, the reporting service 203 can obtain a query result from the search engine 142. In some examples, the query might require conducting a query against the data store service 109 and the NoSQL data store 125 that houses the data records 110 received from the management computing environment 103. The query results that include the raw data requested from the search engine 142 or data store service 109.

At step 407, the reporting service 203 can generate the requested analytics. Depending upon the request, the analytics can be formatted in various ways. In one example, a report scheduled by the report scheduler 218 can be generated and saved in the reporting data store 212. In another example, the requested analytics can be formatted and provided in a user interface accessed from a reporting client 250.

The flowcharts shown in FIGS. 3-4 show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The management computing environment 103 and hosted computing environment 104 can include at least one processing circuit. Such a processing circuit can include, for example, one or more processors and one or more storage or memory that are coupled to a local interface. The local interface can include, for example, a data bus with an accompanying address/control bus or any other suitable bus structure. Similarly, the client devices 106 can include at least one processing circuit. Such a processing circuit can include, for example, one or more processors and one or more storage or memory devices that are coupled to a local interface.

The storage or memory devices can store data or components that are executable by the processors of the processing circuit. For example, the management service 115 and/or other components can be stored in one or more storage devices and be executable by one or more processors in the management computing environment 103 or the hosted computing environment 104.

The management service 115 and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 115 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for storage and reporting of data records associated with management of a population of devices enrolled with a management service, comprising:
   obtaining, from the management service, a data record on a first data stream established within a computing environment, the data record associated with an event occurring with respect to a device from the population of devices;
   executing, in response to the data record being uploaded to the first data stream, a first event-driven code within the computing environment, the first event-driven code configured to generate a unique identifier for the data record, the first event-driven code further configured to store the data record within a data store service;
   obtaining, in response to the data record being stored in the data store service, the data record and the unique identifier on a second data stream established within the computing environment;
   executing, in response to the data record being uploaded to the second data stream, a second event-driven code within the computing environment, the second event-driven code configured to store the data record and the unique identifier in a search engine within the computing environment; and
   generating a report based upon the data record and data within a search index associated with the search engine, the report comprising information associated with at least one of the population of devices.

2. The method according to claim 1, further comprising executing, in response to the data record being uploaded to the second data stream, a third event-driven code within the computing environment, the third event-driven code configured to store the data record and the unique identifier in an archiving service within the computing environment.

3. The method according to claim 1, wherein the first event-driven code and the second event-driven code comprise code defined in a serverless computing service within the computing environment.

4. The method according to claim 1, wherein generating the report further comprises generating analytics based upon the data within the search index, wherein the analytics are associated with a particular enterprise account within the management service.

5. The method according to claim 1, wherein the unique identifier is based upon an organizational group associated with a user account linked to the device from the population of devices.

6. The method according to claim 1, further comprising authenticating the management service based upon an authentication token received from the management service prior to obtaining the data record on the first data stream.

7. The method according to claim 1, wherein generating the report further comprises generating a scheduled report based upon a particular window of time of the data within the search index.

8. A non-transitory computer-readable medium embodying program code executable in at least one computing device for storage and reporting of data records associated with management of a population of devices enrolled with a management service that, when executed by the at least one computing device, directs the at least one computing device to at least:
obtain, from the management service, a data record on a first data stream established within a computing environment, the data record associated with an event occurring with respect to a device from the population of devices;
execute, in response to the data record being uploaded to the first data stream, a first event-driven code within the computing environment, the first event-driven code configured to generate a unique identifier for the data record, the first event-driven code further configured to store the data record within a data store service;
obtain, in response to the data record being stored in the data store service, the data record and the unique identifier on a second data stream established within the computing environment;
execute, in response to the data record being uploaded to the second data stream, a second event-driven code within the computing environment, the second event-driven code configured to store the data record and the unique identifier in a search engine within the computing environment; and
generate a report based upon the data record and data within a search index associated with the search engine, the report comprising information associated with at least one of the population of devices.

9. The non-transitory computer-readable medium according to claim 8, wherein the at least one computing device is further directed to at least execute, in response to the data record being uploaded to the second data stream, a third event-driven code within the computing environment, the third event-driven code configured to store the data record and the unique identifier in an archiving service within the computing environment.

10. The non-transitory computer-readable medium according to claim 8, wherein the first event-driven code and the second event-driven code comprises a serverless computing service within the computing environment.

11. The non-transitory computer-readable medium according to claim 8, wherein generating the report further comprises generating analytics based upon the data within the search index, wherein the analytics are associated with a particular enterprise account within the management service.

12. The non-transitory computer-readable medium according to claim 8, wherein the unique identifier is based upon an organizational group associated with a user account linked to the device from the population of devices.

13. The non-transitory computer-readable medium according to claim 8, wherein the at least one computing device is further directed to at least authenticate the management service based upon an authentication token received from the management service prior to obtaining the data record on the first data stream.

14. The non-transitory computer-readable medium according to claim 8, wherein the report is further generated by generating a scheduled report based upon a particular window of time of the data within the search index.

15. A system for storage and reporting of data records associated with management of a population of devices enrolled with a management service that, comprising:
a plurality of computing devices arranged in a hosted computing environment, wherein the hosted computing environment is directed to at least:
obtain, from the management service, a data record on a first data stream established within the hosted computing environment, the data record associated with an event occurring with respect to a device from the population of devices;
execute, in response to the data record being uploaded to the first data stream, a first event-driven code within the hosted computing environment, the first event-driven code configured to generate a unique identifier for the data record, the first event-driven code further configured to store the data record within a data store service;
obtain, in response to the data record being stored in the data store service, the data record and the unique identifier on a second data stream established within the hosted computing environment;
execute, in response to the data record being uploaded to the second data stream, a second event-driven code within the hosted computing environment, the second event-driven code configured to store the data record and the unique identifier in a search engine within the hosted computing environment; and
generate a report based upon the data record and data within a search index associated with the search engine, the report comprising information associated with at least one of the population of devices.

16. The system according to claim 15, wherein the hosted computing environment is further directed to at least execute, in response to the data record being uploaded to the second data stream, a third event-driven code within the hosted computing environment, the third event-driven code configured to store the data record and the unique identifier in an archiving service within the hosted computing environment.

17. The system according to claim 15, wherein the first event-driven code and the second event-driven code comprises a serverless computing service within the hosted computing environment.

18. The system according to claim 15, wherein generating the report further comprises generating analytics based upon the data within the search index, wherein the analytics are associated with a particular enterprise account within the management service.

19. The system according to claim 15, wherein the unique identifier is based upon an organizational group associated with a user account linked to the device from the population of devices.

20. The system according to claim 15, wherein the hosted computing environment is further directed to at least authenticate the management service based upon an authentication token received from the management service prior to obtaining the data record on the first data stream.

* * * * *